(12) United States Patent
Byren et al.

(10) Patent No.: US 6,330,256 B1
(45) Date of Patent: Dec. 11, 2001

(54) METHOD AND APPARATUS FOR NON-DISPERSIVE FACE-COOLING OF MULTI-CRYSTAL NONLINEAR OPTICAL DEVICES

(75) Inventors: Robert W. Byren, Hermosa Beach; David S. Sumida, Los Angeles, both of CA (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/495,493

(22) Filed: Feb. 1, 2000

(51) Int. Cl.$^7$ ................... H01S 3/10; H01S 3/04
(52) U.S. Cl. .......................... 372/21; 372/36
(58) Field of Search ................ 372/21, 22, 36, 372/35, 34

(56) References Cited

U.S. PATENT DOCUMENTS

| | | | |
|---|---|---|---|
| 5,363,391 | 11/1994 | Matthews et al. | 372/36 |
| 6,101,201 | * 8/2000 | Hargis et al. | 372/36 |
| 6,134,258 | * 10/2000 | Tulloch et al. | 372/99 |

OTHER PUBLICATIONS

David Eimerl, "High Average Power Harmonic Generation", *IEEE Journal of Quantum Electronics*, vol. QE–23, No. 5, May 1987, pp. 575–592.

V.D. Volosov et al, "Suppression of degenerate parametic processes limiting frequency–doubling efficiency of crystals", *Sov. J. Quantum Electron*, vol. 6, No. 10, Oct. 1976, pp. 1163–1167.

Digest of Technical Papers, Conference on Lasers and Electro–Optics, Apr. 26–May 1, 1987, OSA/IEEE, Baltimore, Maryland, pp. 258–259.

Mary A. Norton et al, DK*P Frequency Doubler for High Average Power Applications, *SPIE*, vol. 1223, pp. 75–83, (1990) (No Month).

Marvin J. Weber, Ph.D., "CRC Handbook of Laser Science and Technology, Supplement 2: Optical Materials", p. 603 (No date).

P.A. Studenikin, "$GdVO_4$ as a new medium for solid–state laser: some optical and thermal properties of crystals doped with $Cd^{3+}$, $Tm^{3+}$, and $Er^{3+}$ ions", *Quantum Electronics*, vol. 25, No. 12, pp. 1162–1165 (1995) (No Month).

Marvin J. Bwver, Ph.D., "CRC Handbook of Laser Science and Technology, vol. V, Part 3: Applications, Coatings, and Fabrication", pp. 304–316 1987, (No Month).

\* cited by examiner

*Primary Examiner*—James W. Davie
(74) *Attorney, Agent, or Firm*—Colin M. Raufer; Leonard A. Alkov; Glenn H. Lenzen, Jr.

(57) ABSTRACT

A face-cooling scheme is used with multiple nonlinear crystal formats used primarily for second harmonic generation without the need for air-path rephasing between the crystals. Birefringent crystals, e.g., $MgF_2$, are cut and oriented such that there is no dispersion between the fundamental and second harmonic wavelengths within each crystal. The crystals are then disposed in a heat-conducting housing sandwiched by two or more nonlinear crystals and used as the face-cooling medium, thereby causing the heat generated in the nonlinear crystals by absorption at the fundamental and second harmonic wavelengths to flow longitudinally (direction of beam propagation) into the face-cooling medium. This minimizes any transverse thermal gradient in the nonlinear crystals and the attendant dephasing loss. The crystals can be dry stacked with a very small gas-filled gap, immersed in a liquid or gel, bonded with optical cement, optically contacted, or diffusion-bonded together to form a composite crystal. Heat generated in the nonlinear optical elements is passively conducted to the birefringent crystals in a direction parallel to the direction of laser energy propagation and then to the housing.

27 Claims, 3 Drawing Sheets

METHOD AND APPARATUS FOR NON-DISPERSIVE FACE-COOLING OF MULTI-CRYSTAL NONLINEAR OPTICAL DEVICES

TECHNICAL FIELD

The present invention relates generally to cooling techniques for multiple (at least two) nonlinear optical elements employed in laser systems, and, more particularly, to conductive face-cooled nonlinear optical elements for use in laser systems.

BACKGROUND ART

The process of frequency conversion in a nonlinear material generates heat within the nonlinear material medium due to absorption. This heat must be removed if the frequency converter is to operate efficiently at a significant power.

One method of heat removal in solid state crystalline materials employed in laser systems is to remove the heat from the sides of the materials, in a direction transverse to the direction of laser energy propagation. The removal of heat in a transverse direction causes thermal gradients in this direction. This creates two problems. The first problem is that thermal-optical stress and index variations cause thermal aberrations that distort the laser beam. The second problem is that, in most frequency conversion materials, for example, the temperature variation in a direction transverse to the direction of propagation of the laser beam must be maintained to within a very small tolerance range. The presence of a thermal gradient in this direction severely limits the aperture size and the power loading allowed in a laser system design.

U.S. Pat. No. 5,363,391, entitled "Conductive Face-Cooled Laser Crystal", and issued to Steven C. Matthews et al on Nov. 8, 1994, discloses and claims techniques for passively removing heat from an optical element in a laser system through its optically transmissive faces. Heat is removed by way of optically transmissive heat conducting media disposed adjacent the optically transmissive surfaces of the optical element. Heat is transferred out of the optical element in a direction parallel to the direction of propagation of optical radiation, thus minimizing problems associated with thermal gradients. Devices employing optical elements such as nonlinear frequency conversion crystals and laser crystals may utilize the heat management approach to achieve better performance. Heat is transferred to the heat conducting media by direct contact or through narrow gas-filled gaps disposed between the optical element and the heat conducting media.

While that patent is well-suited for its intended use, improvements are sought to overcome certain remaining problems. Specifically, that patent teaches the use of a traditional dispersive material as a face-cooling medium. However, when two or more crystals are used for efficient second harmonic generation (SHG), for example, the dispersive medium causes the fundamental and the second harmonic beams to be dephased (out of phase with respect to each other) at the output of the face-cooling medium. If a second crystal is placed next to the face-cooling medium, the random phase could cause conversion from the second harmonic back into the fundamental, decreasing the effectiveness of the SHG process. This problem was overcome on earlier multi-crystal testbeds by using the dispersive nature of air to rephase the fundamental and second harmonic. This approach, however, requires separating the face-cooled crystal modules by an air path that is different for each individual product, requiring space (many centimeters of additional beam path) and adding to the manufacturing complexity (active adjustment of crystal spacing).

Thus, there is a need to provide a face-cooling method such as taught in U.S. Pat. No. 5,363,391, but for use with multiple nonlinear crystal formats used primarily for second harmonic generation without the need for air-path rephasing between the crystals.

DISCLOSURE OF INVENTION

In accordance with the present invention, the face-cooling method taught in U.S. Pat. No. 5,363,391 is used with multiple nonlinear crystal formats used primarily for second harmonic generation without the need for air-path rephasing between the crystals. One or more birefringent crystals are cut and oriented such that there is no dispersion between the fundamental and second harmonic wavelengths within each crystal. The birefringent crystals are then disposed in a heat-conducting housing, sandwiched between two or more nonlinear crystals and used as the face-cooling medium. The multiple crystal assembly may be further sandwiched between optically transmissive windows which need not be birefringent or non-dispersive, these windows being used to protect the outermost nonlinear crystals and/or provide additional face cooling. This causes the heat generated in the nonlinear crystals by absorption at the fundamental and second harmonic wavelengths to flow longitudinally (direction of beam propagation) into the face-cooling medium, thereby minimizing any transverse thermal gradient in the nonlinear crystals and the attendant dephasing loss. The crystals can be dry stacked with a very small gas-filled gap as taught in U.S. Pat. No. 5,363,391, immersed in a liquid or gel of suitable refractive index, bonded with suitable optical cement, optically contacted, or diffusion-bonded together to form a composite crystal. For example, $MgF_2$ is used as a specific case, but the invention is not limited to one particular medium. Other suitable candidates are listed, although it is not an exhaustive list by any means.

Specifically, an optical device for use in a laser system is provided, the optical device comprising:

(a) a heat-conducting housing;

(b) at least two nonlinear optically transmissive optical elements having first and second surfaces disposed in the heat-conducting housing for propagating laser energy in a direction substantially transverse to the plane of the first and second surfaces;

(c) at least one birefringent optically transmissive window cut and oriented so that there is no dispersion between the optical fields involved in the nonlinear interaction occurring within said nonlinear optical elements and that comprises an optically transmissive heat sink, each window disposed adjacent each nonlinear optical element such that each birefringent window is sandwiched by two nonlinear optical elements; and (optionally);

(d) one or two optically transmissive windows that may comprise optically transmissive heat sinks, each window disposed adjacent the exposed faces of the outermost nonlinear optical elements (the outer windows need not be birefringent or oriented for non-dispersion).

Heat generated in the optical elements is passively conducted to the optically transmissive windows in a direction essentially parallel to the direction of laser energy propagation and then to the housing through the optically transmissive windows.

BEST MODES FOR CARRYING OUT THE INVENTION

Figure 1:
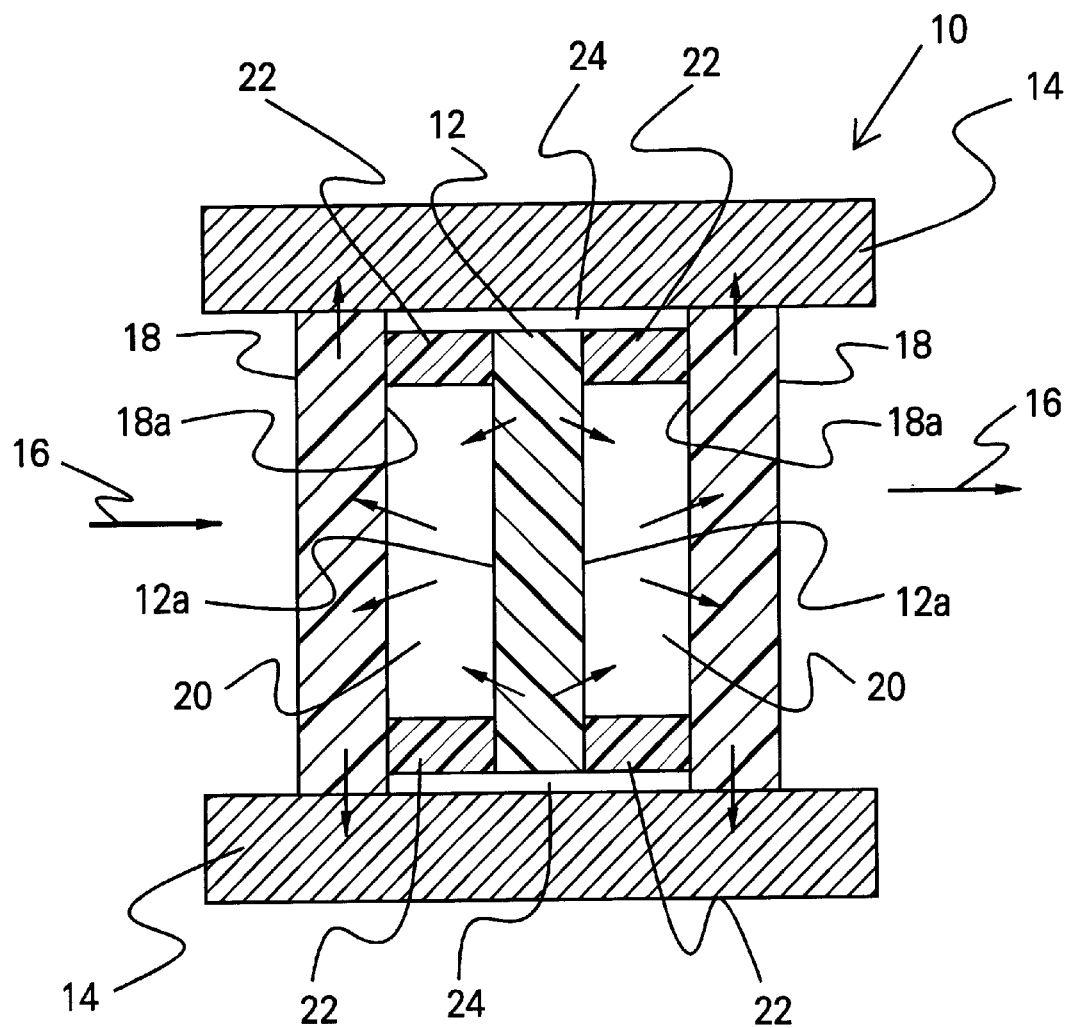
FIG. 1 illustrates a portion of an optical system that incorporates conductive face cooling in a prior art structure.

High power nonlinear conversion, particularly second harmonic generation (SHG) which is also referred to in the art as frequency doubling, has been the subject of considerable development. SHG is useful as a means of converting the near-infrared output of solid-state lasers into the visible and near-UV regions of the spectrum where compact, efficient and reliable fundamental laser sources do not exist. One very contemporary application is satellite imaging from the ground, which is best done with frequency-doubled Nd:YAG or Yb:YAG lasers. (YAG is yttrium aluminum garnet.) Fortunately, there are now a number of very robust nonlinear crystals, which provide good conversion to the green with minimal absorption.

Table I lists the properties of three crystal candidates for these applications, showing the superiority of lithium triborate ($LiB_3O_5$ or LBO) for moderate average power (>50 W) operation, low walkoff angle, high nonlinear coefficient, wide acceptance angle, and good transmission (assumed to be comparable to $\beta$-barium borate ($\beta$-$BaB_2O_4$ or BBO) but not measured). For the following analyses, Type I phase matched LBO is assumed as the crystal of choice, which requires that the fundamental and second harmonic fields have orthogonal polarizations. In Table I, KTP is potassium titanyl phosphate, $KTiOPO_4$.

TABLE I

Characteristics of Candidate SHG Materials for Moderate Power Conversion from 1 μm.

| Parameter | Value | | |
| --- | --- | --- | --- |
| | LBO | BBO | KTP |
| Type phase matching | I | I | II |
| Walkoff angle (mr) | 8.16 | 56.9 | 6.30 |
| $d_{eff}$ (pm/V) | 0.83 | 2.05 | 2.69 |
| Acceptance angle (mr-cm) FWHM | 3.93 | 0.55 | 6.93 |
| SHG Acceptance Bandwidth ($cm^{-1}$-cm) FWHM | 32 | 18 | 5.70 |
| Temperature Range (° K.-cm) FWHM | 7.02 | 37.9 | 40.66 |
| Transmission Range (nm) | 160 to 2,600 | 185 to 2,600 | 350 to 4,500 |
| Absorption at 515 nm ($cm^{-1}$) | (no data available) | <0.01 | 1.3 to 2.7 |

In the late 1980's, Hughes Aircraft Company (the predecessor to the present assignee) pioneered a new approach to removing the heat generated by absorption of the fundamental and/or second harmonic beam within a nonlinear crystal using conductive cooling through the faces normal to the beam into a high conductivity crystal such as sapphire. This had the advantage of encouraging heat to flow longitudinally through the nonlinear crystal. Longitudinal gradients produce one-quarter the dephasing of lateral gradients and, for multiple crystals, the dephasing does not accumulate. The problems associated with dephasing in high average power nonlinear processes are well described in the literature and not repeated here; see, e.g., D. Eimerl, "High Average Power Harmonic Generation", *IEEE Journal of Quantum Electronics*, Vol. QE-23, No. 5, pp. 575–592 (May 1987). At that time, diffusion bonding of dissimilar crystals was not contemplated; therefore, the cooling crystals and nonlinear crystals were physically separated, and the thermal conduction path was through a small stagnant gas-filled gap between the crystals.

FIG. 1 illustrates a conductive face-cooled crystal, as disclosed and claimed in U.S. Pat. No. 5,363,391. Specifically, FIG. 1 shows a portion of a laser system 10 that incorporates a crystal 12 that is secured in an aluminum or other metal housing 14. The crystal 12 may include a nonlinear frequency conversion crystal. The housing 14 may also be made of heat conducting materials other than metal. The direction of laser propagation is shown by arrows 16.

The crystal 12, which may be a nonlinear harmonic generation crystal such as a $KTiOPO_4$ (KTP) crystal, is cooled using heat conduction to adjacent heat conducting media 18 through optical surfaces 12a that constitute its clear aperture. Typical heat conducting media 18 may comprise sapphire optical windows, for example. The heat is transferred (as illustrated by the arrows) to the heat conducting media 18 by direct contact whereby the crystal 12 is placed in contact with adjacent surfaces 18a of each of the heat conducting media 18.

Alternatively, as was actually demonstrated, heat may be transferred through a narrow gas-filled gap 20 disposed between the optical surfaces 12a and each of the adjacent heat conducting media 18. The gas-filled gap 20 is typically on the order of 0.00025 inch in thickness. The gas employed in the gap 20 may be air or nitrogen, or other suitable transmissive gas, depending upon the laser operating environment. The gap 20 may be formed by placing an O-ring, dielectric spacer, or shim 22 between the crystal 12 and the heat conducting media 18. The dielectric spacer 22 may be formed by depositing a thin film onto the surface of the heat conducting media 18. The crystal 12 is thermally insulated from the housing 14, as is shown in FIG. 1 by the gaps 24 between the upper and lower edges of the crystal 12 and the adjacent portions of the housing 14.

About the same time Hughes Aircraft Company was developing the conductive face-cooling concept described above, a variety of multiple crystal formats for SHG were being investigated, including tandem, quadrature, and Alternately Reversed Crystal Axis (ARCA or Alternating-Z), which differed in the orientation of the crystal axes of the successive crystals. The theory behind multiple crystal formats is well described in the literature and not repeated here; see, e.g., V. D. Volosov et al, "Suppression of Degenerate Parametric Processes Limiting Frequency Doubling Efficiency of Crystals", *Soviet Journal of Quantum Electronics*, Vol. 6, No. 10, pp. 1163–67 (October 1976); L. D. Siebert et al, "Multiple-crystal High-efficiency Frequency Conversion for Long-pulse Lasers", *Technical Digest, Conference on Lasers and Electroptics*, paper THK26 (1987); and M. A. Norton et al, "KD*P Frequency Doubler for High Average Power Applications", *SPIE Vol. 1223 Solid State Lasers*, pp. 75–83 (1990). With these schemes, it was necessary to develop a method of rephasing the second harmonic field to the fundamental field to ensure good conversion within the subsequent crystal(s). A sapphire cooling crystal, for example, has a dispersion between 1.06 μm and 1.54 μm of 2π radians per 62 μm of crystal length. Rather than try to fabricate the crystal precisely to give a length that is an integral multiple of 62 μm, the investigators added an air path between the SHG modules that offset the dispersion in the cooling crystals (air has a dispersion of 2π/12.1 cm and it is much easier to control the distance between modules to this tolerance). The problem was that the required air path distance could be anything from 0 cm to 12.1 cm, which is easy to set and fine tune in the lab but presents a real problem in the design of compact producible hardware. While it is possible to machine the thickness of the sapphire to micrometer tolerances, this is expensive and is somewhat temperature sensitive. For moderate average power lasers, it is desirable to use many nonlinear crystal segments to divide the thermal load and minimize the longitudinal gradients. This is not practical with air path rephasing, and creates a tolerance buildup problem with the cooling crystal thickness control approach.

The present invention obviates the need for individually tuned air paths and precise thickness control by using a crystal for face-cooling that is not dispersive between the fundamental and second harmonic wavelengths, thereby ensuring that the two fields remain phased regardless of the length of the face-cooling crystal.

This approach can be used to frequency double the laser radiation from a near-infrared solid-state laser device to create a high brightness (>50 Watt average power, <2 times diffraction limited beam quality) visible beam. This approach is therefore applicable, for example, to satellite imaging and laser communications, where short wavelength operation is advantageous, and a variety of naval applications requiring blue-green light for ocean propagation. This approach can also be used for other non-linear processes in crystals, including optical parametric oscillation (OPO) and optical parametric amplification (OPA), which are improved through the use of face-cooling and multi-crystal formats. This approach is therefore applicable, for example, to chemical/biological detection using differential absorption and scattering in the infrared and laser induced fluorescence spectroscopy in the near-UV, which require wavelength tunability.

The present invention solves the above-mentioned re-phasing problem by recognizing the fact that certain birefringent crystals can be cut and oriented in such a way that the dispersion between two harmonic optical fields can be zeroed. The key advantage with a non-dispersive optical element as disclosed herein is that the thickness tolerance is completely relaxed, resulting in a far simpler and cheaper design that is easily fabricated and implemented. This is in contrast to the prior art using sapphire and air in which the air path distance was specifically constrained to be a particular value so as to exactly compensate the dephasing of the beams from their transit through the sapphire.

A discussion in detail of the specific case of uniaxial crystals which have one unique optical axis (the so-called c-axis) now follows in order to illustrate the present invention in a simple and straightforward manner. Biaxial crystals ($n_x \neq n_y \neq n_z$) are also possible candidates, but are more complex and will be discussed briefly at the end of this section.

There are two types of uniaxial crystals, depending on whether $n_e$ is greater than or smaller than $n_o$, where $n_o$ is the ordinary refractive index at a given wavelength and $n_e$ is the extreme extraordinary refractive index at that wavelength (for propagation perpendicular to the c-axis). A positive uniaxial crystal has an $n_e$ greater than $n_o$ and a negative uniaxial crystal has an $n_e$ smaller than $n_o$. These two cases define two different conditions for non-dispersion where the following terms for the different refractive indices are defined as follows in Tables II and III:

TABLE II

Positive Uniaxial Notation.

| Frequency | $n_o$ | $n_e$ |
|---|---|---|
| ω | $n_o^+(\omega)$ | $n_e^+(\omega)$ |
| 2ω | $n_o^+(2\omega)$ | $n_e^+(2\omega)$ |

TABLE III

Negative Uniaxial Notation.

| Frequency | $n_o$ | $n_e$ |
|---|---|---|
| ω | $n_o^-(\omega)$ | $n_e^-(\omega)$ |
| 2ω | $n_o^-(2\omega)$ | $n_e^-(2\omega)$ |

The "+" and "−" superscripts refer to positive and negative uniaxial cases, respectively. Now, in order to match the refractive index of the fundamental frequency, ω, to that of the second harmonic frequency, 2ω, (i.e., zero dispersion) the appropriate propagation wavevector with respect to the optic-axis must be chosen such that the resultant refractive index $n_e(\theta)$ is identical to the ordinary refractive index for the other frequency. That is, the ordinary refractive index for one frequency must lie in between the ordinary and extraordinary refractive indices of the other frequency, or using the notation above, it follows that:

$n_o^+(\omega) < n_o^+(2\omega) < n_e^+(\omega)$            POSITIVE UNIAXIAL $n_o^-(2\omega) < n_o^-(\omega) < n_e^-(2\omega)$            NEGATIVE UNIAXIAL The angle of propagation with respect to the crystal c-axis necessary to give zero dispersion is calculated as follows, where θ is the propagation angle and $n_e(\theta)$ is the index of an extraordinary ray at that angle.

$$n_e(\theta) = \frac{n_o \times n_e}{[n_o^2 \times \sin^2\theta + n_e \times \cos^2\theta]^{1/2}}$$

The propagation angle is defined so that when the beam propagation wavevector is parallel to the optic axis, θ=0° and $n_e(0°)=n_o$, and when the wavevector is perpendicular to the optic axis, θ=90° and $n_e(90°)=n_e$.

Another way to express this criterion is when the dispersion of the ordinary refractive index is less than the birefringence for the fundamental frequency in the case of the positive uniaxial crystal and conversely for the negative uniaxial case, as noted in the following equations:

$n_o^+(2\omega) - n_o^+(\omega) - n_e^+(\omega) - n_e^+)$            POSITIVE UNIAXIAL $n_o^-(2\omega) - n_o^-(\omega) < n_o^-(2\omega) - n_e^-(2\omega)$            NEGATIVE UNIAXIAL where the left-hand side is the dispersion-related refractive index difference and the right-hand side is the birefringence at the specified frequency. After eliminating common terms in the equations, the non-dispersion criterion in uniaxial crystals is now expressed by the following simple inequalities:

$n_o^+(2\omega) < n_e^+(\omega)$            POSITIVE UNIAXIAL $n_o^-(\omega) > n_e^-(2\omega)$            NEGATIVE UNIAXIAL So, when the extreme extraordinary refractive index for the fundamental frequency is greater than the ordinary refractive index for the doubled frequency in a positive uniaxial crystal, then that crystal will perform as a non-dispersive optical element (i.e., phase-preserving) in accordance with the teachings herein. Similarly, when the ordinary refractive index for the fundamental frequency is greater than the extreme extraordinary refractive index for the doubled frequency in a negative uniaxial crystal, then the crystal will be non-dispersive. Several positive and negative uniaxial candidates are listed in Tables IV and V, respectively, which satisfy this non-dispersion criteria using the ubiquitous Nd:YAG laser (i.e., fundamental wavelength of 1.064 μm and doubled wavelength of 532 nm) as an example.

TABLE IV

Positive Uniaxial Candidates.

| Crystal | $n_o^+ (2\omega)$ | $n_e^+ (\omega)$ |
|---|---|---|
| MgF$_2$ | 1.3789 | 1.3851 |
| YLiF$_4$ | 1.4557 | 1.4703 |
| GdVO$_4$ | 2.03303 | 2.19196 |
| YVO$_4$ | 2.0148 | 2.1674 |

TABLE V

Negative Uniaxial Candidates.

| Crystal | $n_o^- (\omega)$ | $n_e^- (2\omega)$ |
|---|---|---|
| LiNbO$_3$ | 2.2461 | 2.2315 |
| NYAB | 1.7553 | 1.7050 |

Note: Values are from *CRC Handbook of Laser Science and Technology*, Vol. V, Part 3, (CRC Press, 1987); *CRC Handbook of Laser Science and Technology*, Supplement 2: Optical Materials (CRC Press, 1995); and P. A. Studenikin et al, "GdVO$_4$ as a New Medium for Solid-state Lasers: Some Optical and Thermal Properties of Crystals Doped with Cd3+, Tm3+ and Er3+ ions", *Quantum Electronics*, Vol. 25, No. 12, pp. 1162–1165 (1995).

In Table IV, MgF$_2$ is magnesium fluoride, YLiF$_4$ is yttrium lithium fluoride, GdVO$_4$ is gadolinium vanadate, and YVO$_4$ is yttrium vanadate. In Table V, LiNbO$_3$ is lithium niobate and NYAB is neodymium yttrium aluminum borate.

PbMoO$_4$ (lead molybdate) may be another negative uniaxial candidate but the incomplete listing of refractive indices in the *CRC Handbook of Laser Science and Technology* make that determination impossible at this time. Note that the prior-art material, sapphire (Al$_2$O$_3$), is a negative uniaxial crystal whose refractive indices do not satisfy these non-dispersion criteria and thus is not useful in the practice of the present invention. Sapphire would be a suitable material, however, for the optional outermost windows because rephasing is not a requirement.

Given the candidate crystals for the non-dispersive window, the next issue is its ability to adequately face-cool the SHG crystal. Hence, one primary parameter in this regard is thermal conductivity, and the aforementioned non-linear crystals are ranked by thermal conductivity value in Table VI.

TABLE VI

Thermal Conductivity Values.

| Crystal | Thermal Conductivity (W/m · K) |
|---|---|
| MgF$_2$ | 11.6 |
| YLiF$_4$ | 6.3 (∥ to a-axis) |
| GdVO$_4$ | ~10.5 (<110> direction)* |
| YVO$_4$ | 5.1 to 5.2 |
| LiNbO$_3$ | 5.6 |

*This value is based on thermal conductivity measurements of 1.3% Nd:GdVO$_4$ and undoped YAG at 300 K [see P.A. Studenikin, et al, Quantum Electronics, Vol. 25, No. 12, pp. 1162–1165 (1995)] and normalized to thermal conductivity measurements for undoped YAG interpolated at 300 K (CRC Handbook of Laser Science and Technology, Supplement 2, pp. 608–609).

As Table VI shows, MgF$_2$ is the best candidate given its high thermal conductivity, which is greater than YAG and only 3 times less than sapphire.

Now, given these crystal choices, it is possible to calculate the angle of propagation such that the effective extraordinary refractive index is equal to the ordinary refractive index per the criteria given above. Consider the specific application of converting a 1.029 μm Yb:YAG beam to 0.5145 μm (514.5 nm) using Type I SHG in a nonlinear crystal such as LBO. The birefringent medium that is selected for face-cooling in this example is MgF$_2$, which has the highest thermal conductivity of all the candidates listed above (11.6 W/m·K) and the following indices of refraction for ordinary ($n_o$) and extraordinary ($n_e$) rays:

| Wavelength | Ordinary Index ($n_o$) | Extraordinary Index ($n_e$) |
|---|---|---|
| 0.5145 μm | 1.37938 | 1.39125 |
| 1.029 μm | 1.37364 | 1.38525 |

As discussed above, non-dispersive propagation is possible in MgF$_2$ because the ordinary index for one of the harmonic fields (in this case, second harmonic at 0.5145 μm) lies between the ordinary and extreme extraordinary indices for the other (fundamental), i.e., 1.37938 lies between 1.37364 and 1.38525.

Figure 2:
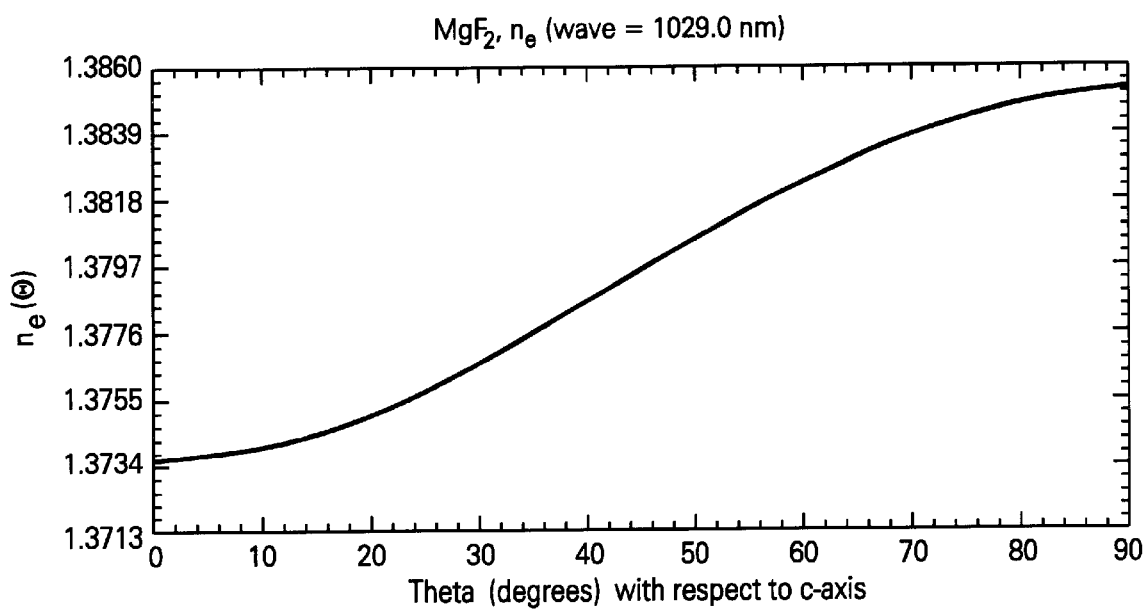
FIG. 2, on coordinates of index of refraction and angle, is a plot of the calculation of $n_e(\theta)$ for $MgF_2$ as a function of angle $\theta$ at the Yb:YAG wavelength of 1029 nm.
Figure 3:
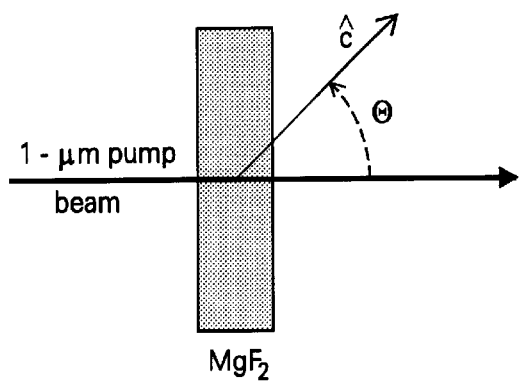
FIG. 3 is a schematic diagram, showing the $MgF_2$ crystal geometry, indicating the c-axis orientation with respect to an input pump beam.

By calculating $n_e(\theta)$ as a function of θ, using the equation given above, the unique angle θ can be found which gives $n_e(\theta)$ equal to $n_o$ at 2ω. In this case, an angle of 44.85°±0.02° gives the appropriate $n_e(\theta)$ value of 1.37938. This stated tolerance is for an arbitrary index-matching requirement out to five (5) decimal places and is for illustration purposes only. Typically in practice, a less stringent amount of index matching is required, in which case the angular tolerance on the c-axis will be relaxed accordingly. For example, an angular tolerance of ±1.0° translates into an index change of ±0.0002. FIG. 2 shows $n_e(\theta)$ as a function of θ for MgF$_2$, and FIG. 3 indicates the crystal orientation with respect to the pump beam.

Finally, as the temperature of the multi-crystal apparatus changes due to self heating or environmental temperature changes, the refractive indices for the fundamental and second harmonic fields must maintain near equality so that the non-dispersive function is maintained for proper phasing. This condition would be satisfied if the temperature dependence of the refractive indices were identical as expressed mathematically here.

$d/dT[n_o^+(2\omega)-n_e^+(\omega,\theta)]=0$         POSITIVE UNIAXIAL $d/dT[n_o^-(\omega)-n_e^-(2\omega,\theta)]=0$         NEGATIVE UNIAXIAL In the case of MgF$_2$, $dn_o/dT$ and $dn_e/dT$ are 1.12×10$^6$/K and 0.58×10$^6$/K, respectively, at 633 nm in the 20° C. temperature range (the dn/dT value will be smaller at 1 μm). So for a 10 K temperature change, $n_e$ will increase $5.4\times10^{-5}$ (i.e., 11.2–5.8) more than $n_o$. Put another way, a 10 K temperature rise creates a index mismatch between $n_e$ (θ) and $n_o$ of roughly $5\times10^{-5}$ which means that the two laser beams will be 180° out of phase after traversing approximately 10 mm of $MgF_2$. So, a thinner non-dispersion material is better for maintaining the phasing of the two beams under changing temperature conditions. Of course, if the SHG crystal is under active temperature control, then this will alleviate the issue just discussed to some extent.

The propagation angle θ with respect to the crystal c-axis may also be adjusted to retune the $n_e$ (θ) value so that it again matches the ordinary refractive index. Based on the discussion above, an angular adjustment of approximately 0.5° would be required for $MgF_2$ in order to exactly compensate a 10 K temperature change. For some applications, an angular adjustment in θ may be the most practical approach.

Figure 4:
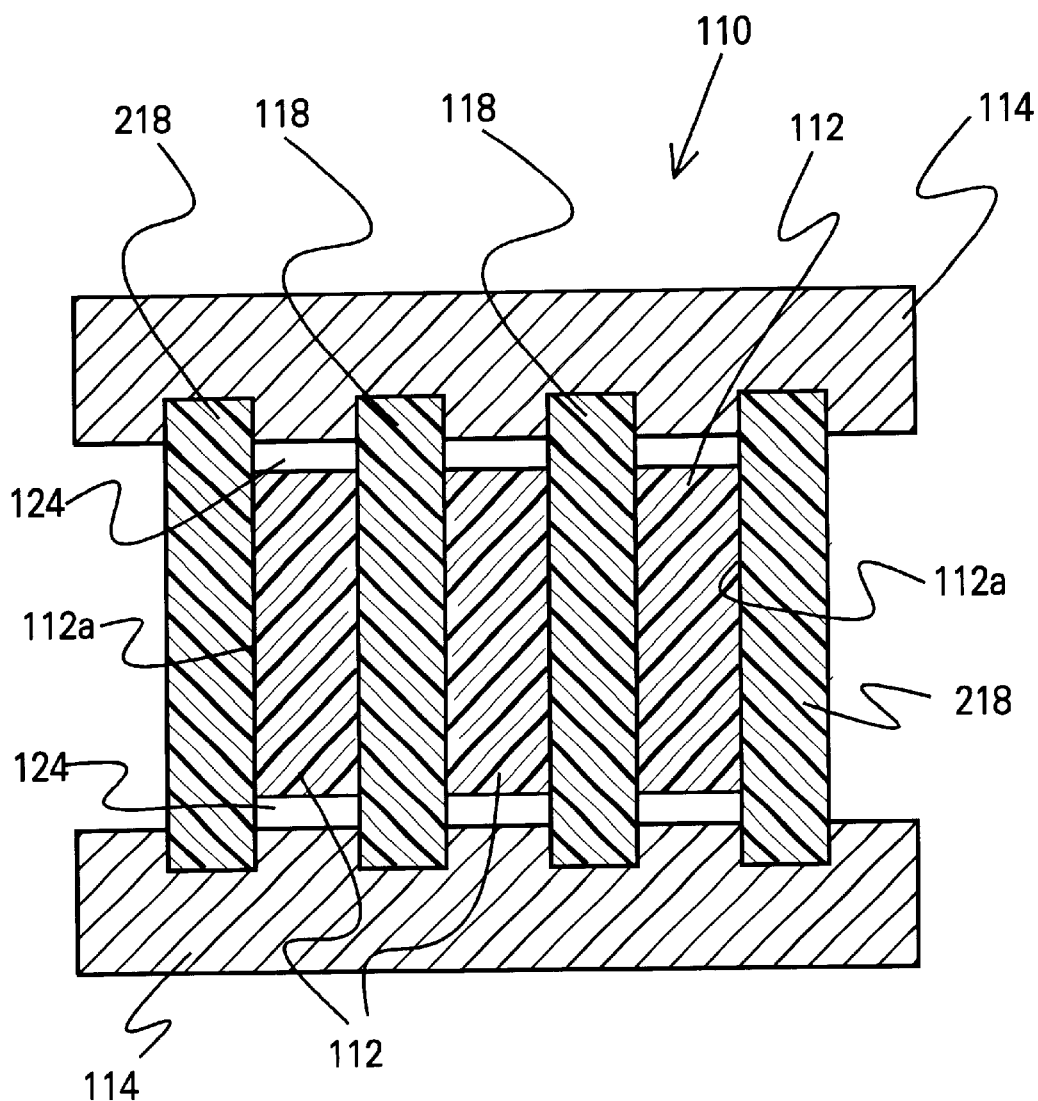
FIG. 4 is a cross-sectional view of a multi-crystal conductively face-cooled non-linear optic apparatus of the present invention.

FIG. 4 shows a cross-sectional view through one embodiment of a multi-crystal conductively face-cooled nonlinear optic apparatus 110 in accordance with the teachings of the present invention. A first plurality (at least two) of nonlinear optically transmissive optical elements (e.g., lithium triborate (LBO) crystals) 112 sized and oriented for best phase matching between the fundamental and second harmonic fields, i.e., highest SHG efficiency, sandwich a second plurality (one less than said first plurality, therefore at least one) of birefringent optically transmissive windows (e..g., magnesium fluoride ($MgF_2$) crystals) 112 of arbitrary thickness which conduct heat through the faces of the LBO to a cold plate structure 114. One or two additional optically transmissive windows 218 may sandwich the first plurality of nonlinear optically transmissive optical elements 118; however, there is no requirement on birefringence or orientation for these windows 218. The SHG crystals 112 can be either physically sandwiched with small gas-filled gaps (not shown) between the SHG crystals and cooling elements 118 and 218 in accordance with the prior art, immersed in a liquid or gel of suitable refractive index, bonded together with a suitable optical cement, optically contacted, or diffusion bonded to the cooling crystals by optical fabrication processes now known in the art and practiced by VLOC (subsidiary of II–VI, Inc.) (New Port Richey, Fla.) and Onyx Optics, Inc. (Dublin, Calif.). Note that a gap 124 is shown between the LBO crystals 112 and the cold plate structure 114. This can be a vacuum or gas-filled gap or filled with a variety of thermally insulating materials to retard heat flow in a lateral direction, thereby minimizing lateral dephasing of the SHG crystal.

In light of the temperature dependence issue raised earlier, an optimum orientation of the propagation angle, θ, will depend on the expected average temperature of the non-dispersive element under actual operating conditions.

Finally, with regard to biaxial crystals, the criteria for non-dispersion is somewhat more complicated given the three unique optical axes whose principal refractive indices along the X, Y and Z aces are typically defined such that $n_x<n_y<n_z$. Given that a crystal's refractive indices follow this notation, one way to define a criteria for non-dispersion is simply stated as $n_x(2\omega)$ must be in between $n_y(\omega)$ and $n_z(\omega)$ so that, under proper crystal orientation with respect to the input polarizations, an intermediate refractive index is found for the fundamental wavelength to match the second harmonic refractive index $n_x$. One example of a biaxial crystal which satisfies this particular criterion is $Gd_2(MoO_4)_3$, gadolinium molybdate. $YAlO_3$, yttrium orthoaluminate, may be another possible candidate based on existing data, but the interpolated refractive index at 2ω is so close to the refractive index $n_z$ at the fundamental wavelength that detailed analysis is required. Another biaxial non-dispersion criterion is $n_x(2\omega)<n_y(\omega)<n_z(2\omega)$. $La_2Be_2O_5$, lanthanum beryllate (BEL), and $Ba2NaNb_5O_{15}$, barium sodium niobate, are two examples that satisfy this second criterion.

Given the additional degree of freedom, it will be noted that these biaxial criteria are not unique, unlike the uniaxial case; other criteria may be defined based on the exact relationship of dispersion and birefringence. Hence, the above list of biaxial crystals is only an exemplary sample and by no means exhaustive.

Thus, there has been described a new and improved optical device comprising face-cooled optical elements for use in high power laser systems employing multiple nonlinear optical elements, using birefringent crystals for face-cooling between the nonlinear optical elements. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. An optical device for use in a laser system, said optical device comprising:

(a) a heat-conducting housing;

(b) at least two nonlinear optically transmissive optical elements having first and second surfaces disposed in said heat-conducting housing for propagating laser energy in a direction substantially transverse to the plane of said first and second surfaces; and (c) at least one birefringent optically transmissive window that comprises an optically transmissive heat sink, each said window comprising a birefringent crystal cut and oriented so that there is no dispersion between a plurality of laser wavelengths within said crystal and each said window disposed adjacent each said optical element such that each said optical window is sandwiched by two said optical elements, whereby heat generated in the optical elements is passively conducted to said birefringent optically transmissive windows in a direction parallel to the direction of laser energy propagation and then to said housing.

2. The optical device of claim 1 wherein two said nonlinear optical elements are outermost and each has an exposed face, said optical device further including one or two outermost optically transmissive windows, each said optically transmissive window disposed adjacent said exposed face of an outermost nonlinear optical element.

3. The optical device of claim 1 further comprising a gap disposed between each said optical element and each said optically transmissive window.

4. The optical element of claim 3 wherein said gap is gas-filled.

5. The optical element of claim 3 wherein said gap is filled with a thermally conducting material.

6. The optical device of claim 1 wherein each said optical element comprises a second harmonic generation laser crystal.

7. The optical device of claim 6 wherein each said optical element is the same and is selected from the group consisting of $LiB_3O_5$, β-$BaB_2O_4$, and $KTiOPO_4$.

8. The optical device of claim 1 wherein each said birefringent optically transmissive window comprises either (a) a positive uniaxial crystal having a non-dispersion criterion given by $$n_o^+(2\omega) < n_e^+(\omega)$$

or (b) a negative uniaxial crystal having a non-dispersion criterion given by $$n_o^-(\omega) > n_e^-(2\omega)$$

where $n_o$ is the ordinary refractive index of the crystal at a given wavelength, $n_e$ is the extreme extraordinary refractive index of the crystal at that wavelength, "+" denotes said positive uniaxial crystal, "−" denotes said negative uniaxial crystal, and $\omega$ is the frequency of laser operation.

9. The optical device of claim 8 wherein each said birefringent optically transmissive window is the same and is either (a) a positive uniaxial crystal selected from the group consisting of $MgF_2$, $YLiF_4$, $GdVO_4$, and $YVO_4$ or (b) a negative uniaxial crystal selected from the group consisting of $LiNbO_3$, NYAB, and $PbMoO_4$.

10. The optical device of claim 1 wherein each said birefringent optically transmissive window comprises a biaxial crystal.

11. The optical device of claim 10 wherein each said birefringent optically transmissive window is the same and is selected from the group consisting of gadolinium molybdate, lanthanum beryllate, yttrium orthoaluminate, and barium sodium niobate.

12. The optical device of claim 1 wherein each said optical element consists essentially of lithium triborate and each said birefringent optically transmissive window consists essentially of $MgF_2$.

13. The optical device of claim 1 further comprising a gap disposed between said nonlinear optically transmissive optical elements and said heat-conducting housing, wherein said gap is a vacuum or is filled with a thermally insulating material.

14. A laser system including:
  (a) a heat-conducting housing;
  (b) at least two nonlinear optically transmissive optical elements having first and second surfaces disposed in said heat-conducting housing for propagating laser energy in a direction substantially transverse to the plane of said first and second surfaces; and
  (c) at least one birefringent optically transmissive window that comprises an optically transmissive heat sink, each said window comprising a birefringent crystal cut and oriented so that there is no dispersion between a plurality of laser wavelengths within said crystal and each said window disposed adjacent each said optical element such that each said optical element is sandwiched by two said windows, whereby heat generated in said optical elements is passively conducted to said birefringent optically transmissive windows in a direction parallel to the direction of laser energy propagation and then to said housing.

15. The laser system of claim 14 wherein two said nonlinear optical elements are outermost and each has an exposed face, said optical device further including one or two outermost optically transmissive windows, each said optically transmissive window disposed adjacent said exposed face of an outermost nonlinear optical elements.

16. The laser system of claim 14 further including a gap disposed between each said optical element and each said optically transmissive window.

17. The laser system of claim 16 wherein said gap is gas-filled.

18. The laser system of claim 16 wherein said gap is filled with a thermally conductive material.

19. The laser system of claim 14 wherein each said optical element comprises a second harmonic generation laser crystal.

20. The laser system of claim 19 wherein each said optical element is the same and is selected from the group consisting of lithium triborate, β-barium borate, and potassium titanyl phosphate.

21. The laser system of claim 20 wherein each said birefringent optically transmissive window comprises either (a) a positive uniaxial crystal having a non-dispersion criterion given by $$n_o^+(2\omega) < n_e^+(\omega)$$

or (b) a negative uniaxial crystal having a non-dispersion criterion given by $$n_o^-(\omega) > n_e^-(2\omega)$$

where $n_o$ is the ordinary refractive index of the crystal at a given wavelength, $n_e$ is the extreme extraordinary refractive index of the crystal at that wavelength, "+" denotes the positive uniaxial crystal, "−" denotes the negative uniaxial crystal, and $\omega$ is the frequency of laser operation.

22. The laser system of claim 21 wherein each said birefringent optical transmissive window is the same and is either (a) a positive uniaxial crystal selected from the group consisting of $MgF_2$, $YLiF_4$, $GdVO_4$, and $YVO_4$ or (b) a negative uniaxial crystal selected from the group consisting of $LiNbO_3$, NYAB, and $PbMoO_4$.

23. The laser system of claim 14 wherein each said birefringent optically transmissive window comprises a biaxial crystal.

24. The laser system of claim 23 wherein each said birefringent optically transmissive window is the same and is selected from the group consisting of gadolinium molybdate, lanthanum beryllate, yttrium orthoaluminate, and barium sodium niobate.

25. The laser system of claim 14 wherein each said optical element consists essentially of lithium triborate and each said birefringent optically transmissive window consists essentially of $MgF_2$.

26. The laser system of claim 14 further comprising a gap disposed between said nonlinear optically transmissive optical elements and said heat-conducting housing, wherein said gap is a vacuum or is filled with a thermally insulating material.

27. A method for cooling at least two nonlinear optically transmissive optical elements supported in a heat-conducting housing, said method comprising:
  (a) providing said heat-conducting housing;
  (b) mounting in said heat-conducting housing said at least two nonlinear optical elements having first and second surfaces for propagating laser energy in a direction substantially transverse to the plane of said first and second surfaces; and
  (c) disposing between each said optical element a birefringent optically transmissive window that comprises an optically transmissive heat sink, each said window comprising a birefingent crystal cut and oriented so that there is no dispersion between a plurality of laser wavelengths within said crystal and each said window disposed adjacent each said optical element such that each said optical element is sandwiched by two said windows.

* * * * *